April 7, 1936.   B. E. LENEHAN   2,036,283

DEMAND LIMITING METER MECHANISM

Filed Jan. 2, 1935

WITNESSES:

INVENTOR
Bernard E. Lenehan.
BY
ATTORNEY

Patented Apr. 7, 1936

2,036,283

UNITED STATES PATENT OFFICE 2,036,283

DEMAND LIMITING METER MECHANISM

Bernard E. Lenehan, Newark, N. J., assignor to Westinghouse Electric & Manufacturing Company, East Pittsburgh, Pa., a corporation of Pennsylvania Application January 2, 1935, Serial No. 56

3 Claims. (Cl. 171—34)

My invention relates to demand limiting meters and particularly to such meters of the block interval type. More specifically, my invention relates to the forms of demand meters provided with load-limiting contacts for commutating a signal or control circuit when the demand, averaged through a demand interval, approaches a fixed or variable limit. In such meters, as heretofore constructed, a load contact is driven at a rate proportional to the load toward a limiting contact, which may be either stationary or movable, and the signal or control circuit is commutated when the load and limit contacts engage.

In one form of such meters known in the prior art, the limit contact is driven in the same direction as the load contact at a constant speed dependent upon the value of a base load which requires a continuous supply of power. The load contact overtakes the limit contact only in the event that the total energy consumption from the start of the demand period is so high that the integrated energy required for the base load during the remainder of the period can barely be supplied without overrunning the demand limit. In this way, the full limit of demand may be used during peak loads without risking interruption of the base load.

For many applications in which the power charges consist of a total energy charge and a maximum demand charge, the above-described meter is admirable. However, in some cases, it is desirable to obtain an indication of the integrated excess of the total load above the base load, either as a basis for an excess charge or for information in connection with load studies. In such cases, the meter described above cannot be utilized for the measurement of all the variables, as no part of the meter moves at a rate proportional to the excess, and it is necessary to provide separate excess meters.

It is an object of my invention to provide a novel demand limiting meter mechanism which may be utilized to measure total energy consumption and maximum demand, and which, without substantial changes in the mechanism, may also be utilized to measure excess quantities where such measurements are necessary.

Figure 1:
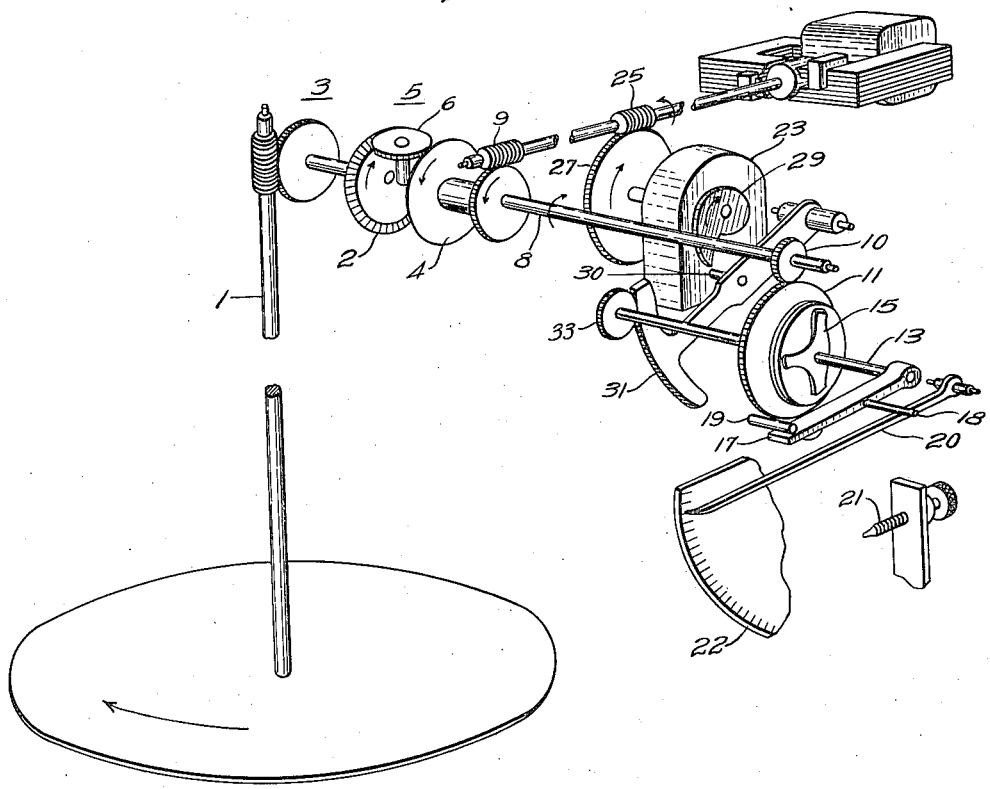
Figure 2:
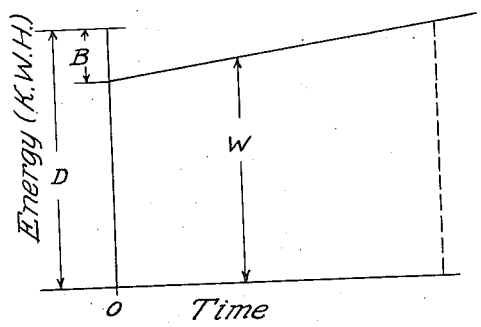

Other objects of my invention will become evident from the following description taken in conjunction with the accompanying drawing in which Figure 1 is a diagrammatic view in perspective of a demand limiting meter mechanism embodying my invention; and, Fig. 2 is a diagram illustrating the operation of my invention.

Referring to Fig. 1 in detail, a main drive shaft 1 is connected by means of gearing 3 to one element 2 of a differential gear 5. A constant speed timer 7 is similarly connected by means of gearing 9 to a second element 4 of the differential gear 5.

The main drive shaft 1 may be the shaft of a meter element energized directly in accordance with a load function such as current or power, or may be that of a secondary element operated by means of electrical impulses in a manner well understood in the art. The timer 7 may be of any suitable mechanical or electrical form known in the art, and is illustrated as a synchronous-type timing motor.

The differential gear 5 is provided with planetary element 6 which is connected by means of a shaft 8 to a pinion 10. The pinion 10 is arranged to drive a gear wheel 11 secured to a shaft 13 by means of a slip-friction clutch 15.

A movable contact arm 17 is secured to the shaft 13 in a position to operate between a fixed stop 19 and an adjustable stationary contact 21. The contact arm 17 may be provided with a pusher 18 for operating a maximum demand pointer 20 in cooperative relationship with a suitable scale 22. Because of the action of the timer 7 and differential gear 5, as will be hereinafter more fully explained, the pointer 20 does not move forward in response to load values less than the average baseload. The initial position of the pointer 20, accordingly, does not correspond to zero demand but to a definite value of demand, corresponding to the baseload.

A spring-motor resetting device 23, of the type usually provided in block-interval demand meters, is driven from the timer 7 by means of a worm 25 and gear 27 and is arranged to rotate a resetting cam 29 one revolution at the expiration of every demand period. As the construction and operation of spring-motor resetting devices such as 23 are well known in the art, detailed illustration and description thereof have been omitted, and the device 23 has been shown diagrammatically. The device 23 operates in the usual manner to hold the cam 29 stationary during substantially one entire revolution of the gear 27, while mechanical energy is being stored in the device, and then to release the stored energy in rotating the cam 29 exactly one revolution.

A resetting segment 31, of known construction, is provided for resetting the shaft 13, by means of a gear wheel 33 at the end of every demand interval in the usual manner. The resetting segment 31 is provided with a pin 30 which is normally free to move in the recessed portion of the cam 29, but which is engaged by the cam and forced downward upon rotation of the latter. The contact arm 17 and resetting segment 31 are shown in their initial positions as normally assumed at the beginning of a demand interval.

Although the gear connections between various parts of my improved meter have been shown in simplified form for purposes of illustration, it will be understood that suitable gear trains, calculated in accordance with the usual engineering practice, would be provided in a practical embodiment of the invention. The ratio of gearing between the timer 7 and the gear wheel 27 is such that the latter completes one revolution during every demand interval, which may be, for example, of 15 minutes duration. The timer 7 drives the element 4 of the differential gear 5 at a comparatively low speed corresponding to the percentage of base load upon which continuity of service is to be maintained. For example, if the base load is 10% of the permissible maximum demand, the element 4 would be driven at a rate corresponding to 10% of the average speed of the element 2 during maximum demand conditions.

The operation of the apparatus shown in Fig. 1 may be set forth as follows: The main shaft 1 acts through the gearing 3 to drive the element 2 of the differential gear 5 at a speed proportional to the load variable being measured. If the load falls to a value corresponding to 10% of permissible maximum demand, the elements 2 and 4 of the differential gear 5 rotate at the same speed, and the planetary element 6 remains stationary. For any higher value of load the planetary element 6 rotates in a direction to move the contact arm 17 toward the stationary contact 21.

The contact arm 17 may or may not engage the contact 21 during the demand interval, depending upon whether the integrated value of the load during the elapsed part of the demand interval approaches a variable limit determined by the integrated value of load which will be drawn by the base load circuit during the remainder of the demand interval, as mentioned above. This relationship will be more fully explained in connection with Fig. 2. If the contact arm 17 engages the contact 21, a circuit (not shown) is completed for directly disconnecting part of the load or for signalling for a reduction of load, either of these operations being common practice in the art.

At the expiration of the demand interval, the resetting device 23 rotates the cam 29 exactly one revolution, forcing the pin 30 and resetting segment 31 down to the position shown. This operation rotates the contact arm 17 into engagement with the stop 19 and causes the clutch 16 to slip slightly as the pin 30 is forced out of the path of the cam 29.

Referring to Fig. 2, the abscissæ represent time and the ordinates an integrated load variable such as energy. Assuming that the integrated load value corresponding to maximum permissible demand throughout the demand interval is indicated by the ordinate D, and the integrated base load throughout the interval by B, the integrated load necessary to effect engagement of the contact arm 17 and contact 21 may be represented by the ordinate W.

At the beginning of the demand interval, the element 4 has not yet turned appreciably, and the total number of revolutions of the element 2 necessary to effect engagement of the contact arm 17 and contact 21 corresponds to the minimum value of the ordinate W. As time elapses, the rotation of the element 4 progressively increases the number of revolutions of the element 2 necessary to effect contact engagement. The value of the ordinate W accordingly increases at a constant rate with respect to time throughout the demand interval, as indicated by the sloping characteristic.

Total power quantities may be measured from the shaft 1 in the usual manner. Excess quantities may be measured from the shaft 8 by means of devices for this purpose known in the art.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a demand limiting device, differential means having a pair of driving elements and a third element differentially responsive to movements of said driving elements, a timing device for moving one of said driving elements at substantially constant speed, means for moving the other of said driving elements at a speed proportional to a load variable, contact means, a contact operating member controlled by said third element and operable from an initial position, and means for periodically resetting said contact operating member to said initial position.

2. In a demand limiting device, differential means having a pair of driving elements and a third element differentially responsive to movements of said driving elements, a timing device for moving one of said driving elements at substantially constant speed, means for moving the other of said driving elements at a speed proportional to a load variable, contact means, a contact operating member associated with said contact means and operable between an initial position and a contact operating position, slip-friction connecting means for driving said contact operating member from said third element, and means for periodically resetting said contact operating member to said initial position.

3. In a demand limiting device, differential means having a pair of driving elements and a third element differentially responsive to movements of said driving elements, meter means for moving a first of said driving elements at a speed proportional to a load variable, contact means, a contact operating member associated with said contact means and operable between an initial position and a contact operating position, slip-friction connecting means for driving said contact operating member from said third element, spring-motor means for periodically resetting said contact operating member to said initial position and a constant speed motive device for moving the second of said driving elements at substantially constant speed and for restoring said spring-motor means to energized condition.

BERNARD E. LENEHAN.